(12) United States Patent
Hatam-Tabrizi et al.

(10) Patent No.: US 6,828,698 B2
(45) Date of Patent: Dec. 7, 2004

(54) GIMBAL FOR SUPPORTING A MOVEABLE MIRROR

(75) Inventors: Shahab Hatam-Tabrizi, San Jose, CA (US); Wei-Hung Yeh, Fremont, CA (US)

(73) Assignee: Lightbay Networks Corporation, Fremont, CA (US)

( * ) Notice: Subject to any disclaimer, the term of this patent is extended or adjusted under 35 U.S.C. 154(b) by 338 days.

(21) Appl. No.: 10/170,978

(22) Filed: Jun. 13, 2002

(65) Prior Publication Data

US 2003/0006360 A1 Jan. 9, 2003

Related U.S. Application Data

(60) Provisional application No. 60/298,488, filed on Jun. 14, 2001.

(51) Int. Cl.[7] .............................................. H02K 41/00
(52) U.S. Cl. ........................... 310/12; 310/13; 359/291
(58) Field of Search ............... 310/12–14; 359/290–298

(56) References Cited

U.S. PATENT DOCUMENTS 6,201,631 B1 * 3/2001 Greywall ..................... 359/245
6,337,760 B1 * 1/2002 Huibers et al. ............. 359/291
6,487,001 B2 * 11/2002 Greywall .................... 359/292

* cited by examiner

Primary Examiner—Thanh Lam
(74) Attorney, Agent, or Firm—Burgess & Bereznak, LLP

(57) ABSTRACT

A gimbal for supporting a moveable mirror includes an attachment section, first and second pairs of beams extending along the x-axis and connected to the attachment section, and third and fourth pairs of beams extending along the y-axis connected with the first and second pair of beams. The connections are such that the mirror can tilt or rotate about both the x-axis and y-axis. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

32 Claims, 15 Drawing Sheets

GIMBAL FOR SUPPORTING A MOVEABLE MIRROR

RELATED APPLICATIONS

This application is related to co-pending applications: Ser. No. 10/170,810, filed Jun. 13, 2002, entitled, "ACTUATOR ASSEMBLY FOR TILTING A MIRROR OR LIKE OBJECT"; and Ser. No. 60/298,488, filed Jun. 14, 2001, entitled, "PHOTONIC SWITCH FOR AN OPTICAL COMMUNICATION NETWORK"; both of which are assigned to the assignee of the present application.

FIELD OF THE INVENTION

The present invention relates generally to apparatus and methods for movement of objects; specifically, objects such as mirrors that direct light beams in optical systems and networks.

BACKGROUND OF THE INVENTION

Fiberoptic technologies and systems have been widely deployed in recent decades. However, certain key components remain expensive and inefficient, which hinders the expansion of optical systems and optical communication networks. One of these components is the wavelength switch, which routes and redirects a light beam from one fiber to another fiber so that the signal can be provisioned and managed according to the demand. A typical wavelength switch used today converts the input light signal into an electronic signal to detect the routing information, switches the electronic signal, and then eventually reconverts it back into a light signal for further transmission. This device, commonly referred to as an Optical-Electrical-Optical (OEO) switch, not only depends on current semiconductor technologies and processes, but also requires a transmitter and a receiver for each transmission port. These factors cause OEO switches to be large in size (e.g., occupying two or more 7-foot tall racks), to have high power consumption (e.g., kilowatts), to be network protocol and transmission rate dependent, to lack scalability, and to be costly.

Thus, there is a need for an alternative apparatus for directing a light beam in an optical system that can be manufactured efficiently and provide improved performance in optical systems and fiber optic-based networks.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A gimbal for use with an actuator and a mirror assembly to guide a light beam for a variety of applications is described. In the following description numerous specific details are set forth, such as angles, material types, configurations, etc., in order to provide a thorough understanding of the present invention. However, persons having ordinary skill in the opto-electronics arts will appreciate that these specific details may not be needed to practice the present invention.

According to one embodiment of the present invention, a gimbal for supporting an actuator-mirror assembly is provided. The assembly is used to control the path of a light beam. The present invention has numerous consumer, medical, and/or industrial applications. For example, laser marking, laser display, optical scanning devices, windshield auto projection, helmet display, personal digital assistant ("PDA"), fiber optic communication network (e.g., an all-optical switch), and mobile phone projection display, to name a few, can all benefit from the present invention.

In a particular embodiment, an electrically conductive gimbal is provided for use with a dual-axis actuator. The gimbal is comprised of a pair of beams that move about the axis of rotation under the influence of an electromagnetic actuator. The conductive connections in the rotary moving coil actuator are integrated with the flexing part of the gimbal. In various embodiments, the actuator may rotate about either a single axis or a dual axis.

Figure 1A:
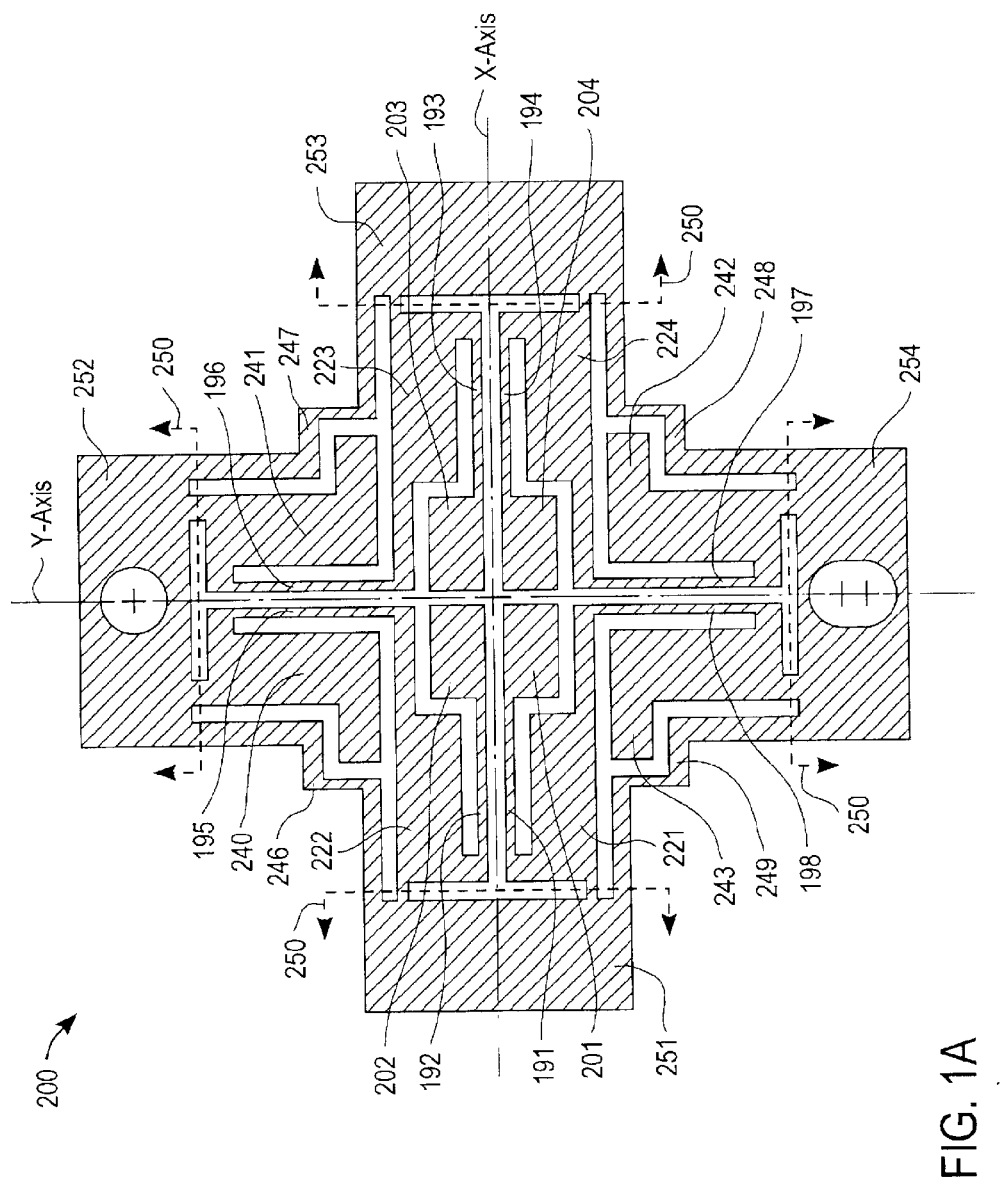
FIGS. 1A & 1B are top views of a gimbal used in accordance with one embodiment of the present invention.
Figure 1B:
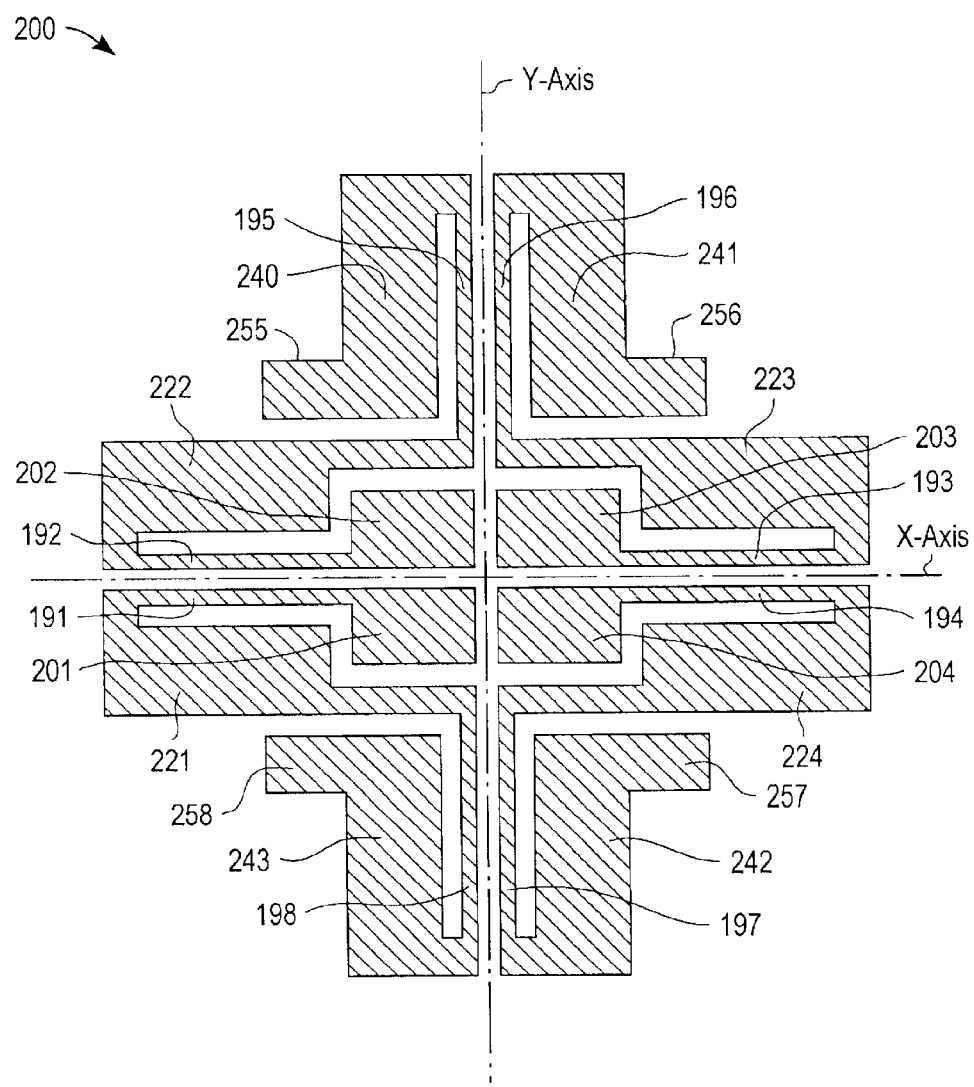

Referring now to FIGS. 1A & 1B, there is shown a top plan view of a gimbal 200 utilized in accordance with one embodiment of the present invention. Gimbal 200 is made from a single, integral sheet of thin metal. FIG. 1A shows gimbal 200 after removal of the "cutout" areas from the sheet metal. FIG. 1B shows the gimbal after removal of the end section and perimeter material, which step is performed during the construction of the actuator-mirror assembly according to one embodiment of the present invention.

The sheet metal used for gimbal 200 is preferably a fully hardened material, such as stainless steel, having high fatigue strength. Other materials providing similar properties may also be used. The material selected should allow the gimbal to rotate the attached mirror (or mirror-coil assembly) with a high rotational angle (e.g., +/−15 degrees) over millions of movement cycles. The material may also be heat-treated. The sheet metal material is also preferably non-magnetic to prevent reluctance forces induced by the magnets in the actuator. In some cases, the sheet metal may also be coated with a corrosion-resistant material, such as titanium-nickel or gold.

Gimbal 200 comprises four attachment pads 201–204 that are centrally located symmetrical about the x-axis (i.e., longitudinal axis) and y-axis (i.e., transverse axis). A mirror, or mirror-pedestal assembly, is adhesively attached to pads 201–204. Thus, in the completed assembly, pads 201–204 are all affixed in a rigid plane, remaining stationary or moving in unison, depending on the particular embodiment of the final actuator-mirror assembly. Thin, elongated beams 191–194 support each of pads 201–204, respectively. In operation, pairs of adjacent beams 191 & 192 and 193 & 194 each twist longitudinally about the x-axis to permit the mirror (attached to pads 201–204) to rotate about the x-axis.

In FIG. 1A, beams 191 & 192 are shown being integrally connected to end section 251 through respective intermediate sections 221 & 222. Similarly, beams 193 & 194 are integrally connected to end section 253 through intermediate sections 223 & 224, respectively. Intermediate sections 221–224 are also integrally connected with thin, elongated beams 195–198, respectively, which permit rotation of the mirror about the y-axis. During rotation of the mirror about the x-axis, pairs of adjacent beams 195 & 196 and 197 & 198 remain substantially rigid. Similarly, during rotation of the mirror about the y-axis, pairs of adjacent beams 195 & 196 and 197 & 198 twist longitudinally about the y-axis, while pairs of adjacent beams 191 & 192 and 193 & 194 remain substantially rigid.

Beams 195 & 196 are shown in FIG. 1A being connected to end section 252 via respective L-shaped mounting sections 240 & 241. Likewise, beams 197 & 198 are both integrally connected to end section 254 through respective L-shaped mounting sections 242 & 243. All of the end sections 251–254 are attached together through a set of perimeter connecting sections 246–249. For example, end section 251 attaches to end sections 252 & 254 via connecting sections 246 & 249, respectively. End section 253 attaches to end sections 252 & 254 via connecting sections 247 & 248, respectively. In this embodiment, end sections 251–254 (beyond dashed lines 250 in FIG. 1A) are removed along with the perimeter connecting sections during the assembly process. FIG. 1B shows gimbal 200 after these metal sections have been removed. This assembly process of this embodiment is described in more detail below.

Figure 2:
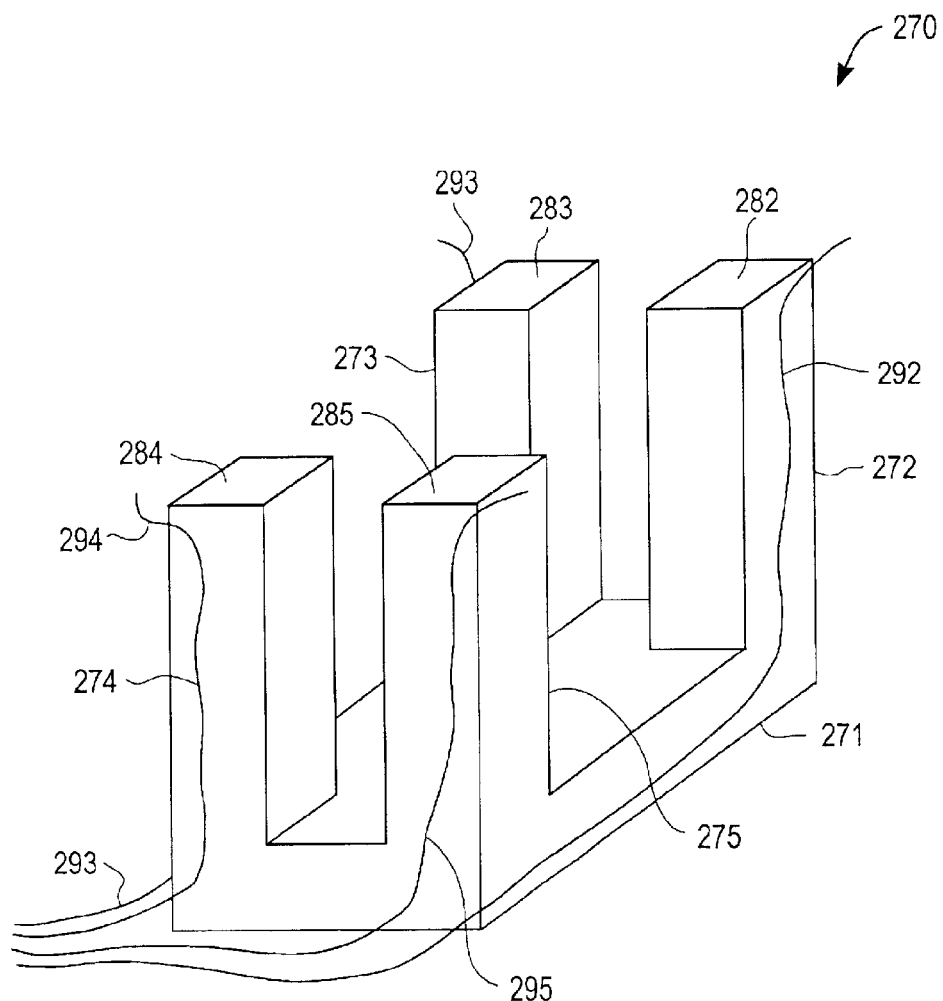
FIG. 2 illustrates a platform that mounts to the gimbal of FIGS. 4A & 4B in an actuator-mirror assembly according to one embodiment of the present invention.

Each of the mounting sections 240–243 of gimbal 200 is fixedly mounted (e.g., with adhesive) to a stationary point or platform mount of the actuator-mirror assembly. FIG. 2 shows one possible implementation of a platform 270 that may be used for this purpose. Platform 270 comprises a base 271 that supports four rigid posts 272–275 of equal height. Each of the posts 272–275 has a flat end surface 282–285, respectively. The dimensions of end surfaces 282–285 and the position of posts 272–275 is such that end surfaces 282–285 align with the rectangular surface areas of mounting sections 240–243 (see FIG. 1B) in a corresponding manner. This permits the mounting sections 240–243 to be adhesively attached to corresponding end surfaces 282–285.

FIG. 2 also shows a set of four thin wires 292–295, each of which is adhesively bonded to respective posts of platform 282–285. These wires connect with the coils that comprise the actuator of the final assembly. Two of the wires are used to energize the coils disposed about the x-axis, and the other two are used to energize the coils disposed about the y-axis.

After gimbal 200 has been mounted to platform 270 each of the wires 292–295 are soldered to corresponding tabs of the mounting sections 240–243. For example, if surface 282 is attached to mounting section 240, wire 292 may be soldered to tab 255. Continuing with this example, with surfaces 283–285 respectively attached to mounting sections 241–243, wires 293–295 may be soldered to tabs 256–258, respectively. Note that in gimbal 200 of FIG. 1B each of tabs 255–258 provides separate electrical connection with respective pads 202, 203, 204, and 201. This feature is utilized to establish electrical connection to the coils of the actuator-mirror assembly, as discussed in more detail shortly.

Metal may be removed from a single piece of thin sheet metal to achieve the gimbal cutout patterns shown in FIGS. 1A & 1B using a variety of conventional methods, such as chemical etching, press cutting, milling, etc. Although a specific rectilinear cutout pattern is shown in these figures, it is understood that other embodiments may have different patterns or a different arrangement of beams, pads, etc., yet still provide rotational movement along the x and y axes in accordance with the present invention.

In the embodiment illustrated by FIGS. 1A & 1B, beams 191–198 are each about 0.05 mm wide, mirror-attachment pads 201–204 are each about 0.4 mm×0.6 mm in dimension, and the thickness of the single piece of sheet metal is about 0.0254 mm. Wires 292–295 are also about 0.0254 mm thick. In certain embodiments, beams 191–198 may be partially etched to make them thinner than the rest of the sheet metal material. For example, beams 191–198 may be chemically etched to a thickness less than 0.0254 mm to increase flexibility and thus achieve a higher degree of rotation.

Figure 3:
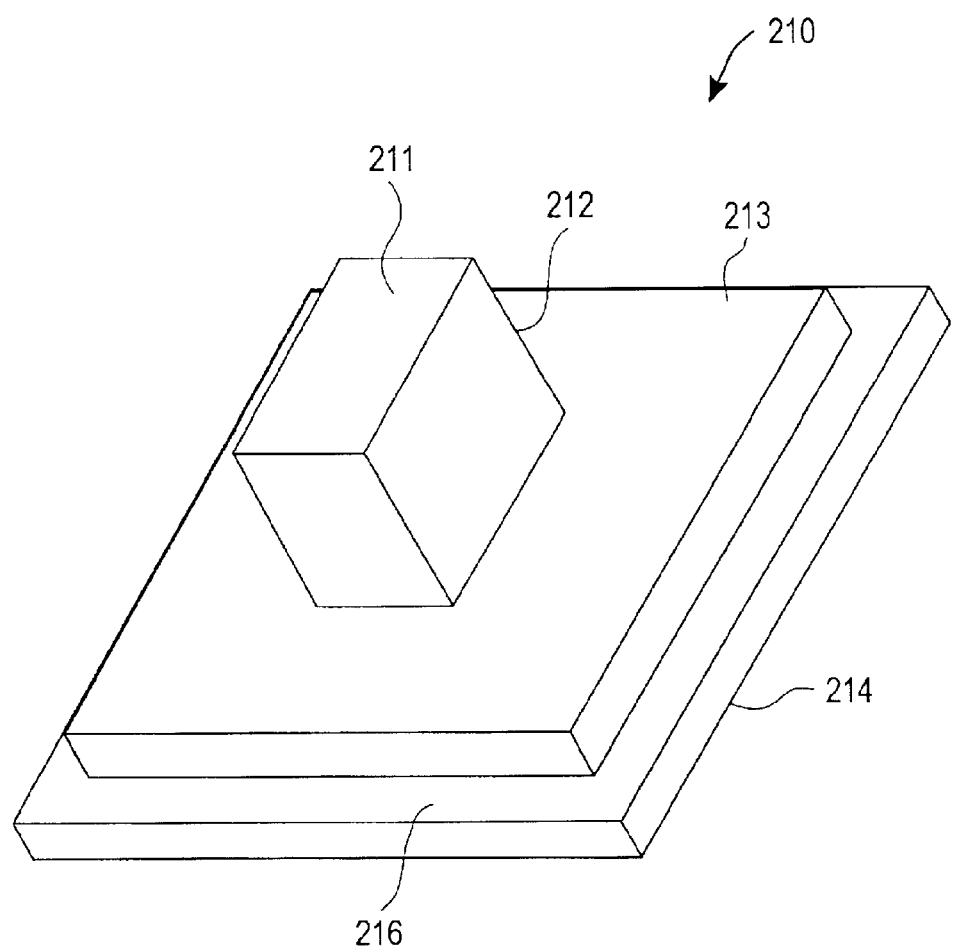
FIG. 3 is a bottom perspective view of an integrated mirror/pedestal 210 utilized in accordance with one embodiment of the present invention.

FIG. 3 is a bottom perspective view of an integrated mirror/pedestal 210 utilized in accordance with one embodiment of the present invention. In the drawing, the polished, reflective surface of mirror 214 faces down and into the page. Integrated mirror/pedestal 210 may be manufactured from a single piece of material such as silicon, Pyrex®, quartz, sapphire, aluminum, or other types of suitable materials.

Integrated mirror/pedestal 210 also includes a base plate 213 between pedestal portion 212 and the back of mirror 214. Base plate is sized smaller than mirror 214 such that a step 216, comprising a peripheral area of the back of mirror 213, is realized. It is appreciated that other embodiments may be constructed from discrete parts (e.g., separate mirror, base plate, and pedestal) rather than being manufactured in integral form. In either approach, the mirror may be about 0.25 mm thick and 2×2 mm in area. The mirror surface may be lapped to a highly polished optical-flat surface. A reflective surface can also be applied by numerous methods, including plating or sputtering gold, silver, or aluminum on a layer of nickel.

Figure 4:
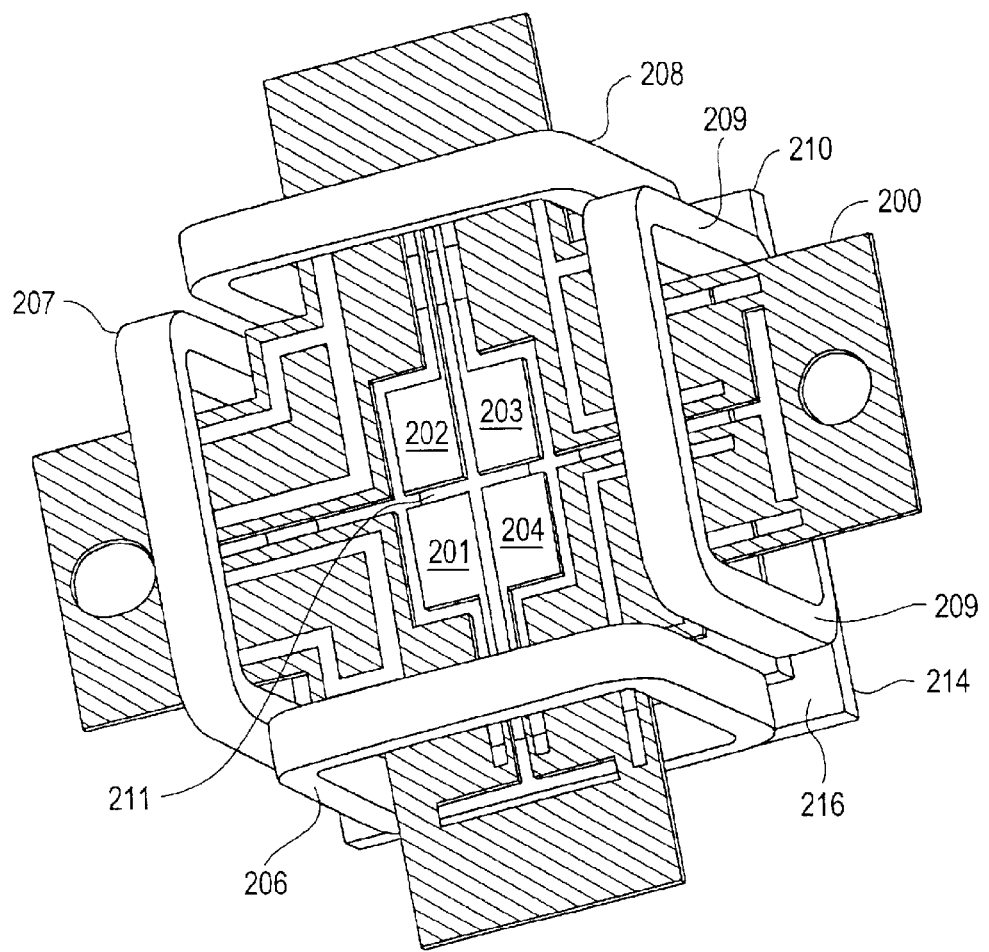
FIG. 4 illustrates an actuator-mirror assembly at an intermediate point of construction according to one embodiment of the present invention.

FIG. 4 shows a bottom perspective view of an actuator-mirror assembly after pads 201–204 have been bonded to surface 211 of integrated mirror/pedestal 210. FIG. 4 also shows four coils 206–209 adhesively bonded to step 216 around the side back surface of mirror 214. Thus, coils 206–209, mirror 214, and pads 201–204 of gimbal 200 are all rigidly coupled together, and move as a single unit, in the actuator-mirror assembly according to one embodiment of the present invention. Note that although FIG. 4 shows the end sections of gimbal 200 before removal at this stage of the assembly process, this is not required. That is, the end and peripheral connecting sections of gimbal 200 may be removed either before or after attachment to the mirror/pedestal assembly.

Figure 5:
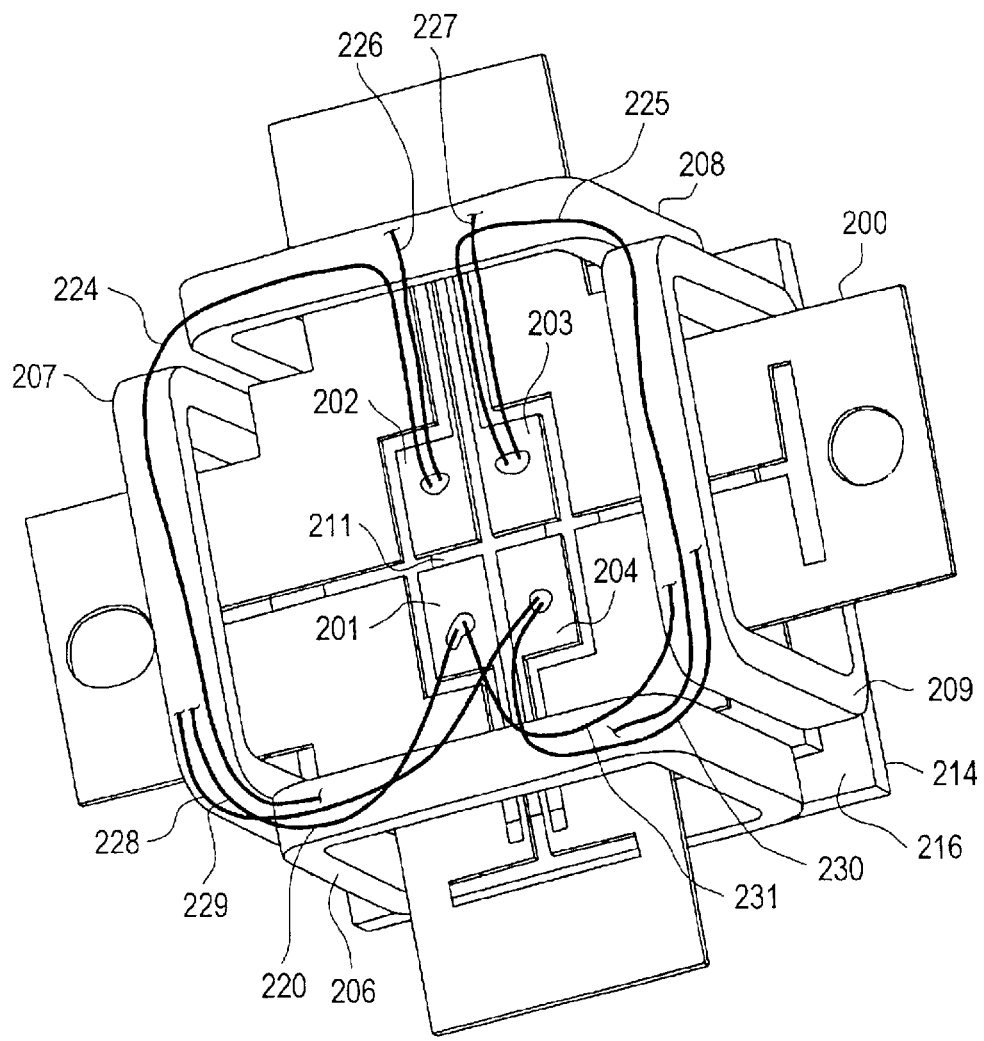
FIG. 5 illustrates an actuator-mirror assembly at a further point of construction according to one embodiment of the present invention.

FIG. 5 is another view of the assembly of FIG. 4 after soldering of pairs of coil wires to the back of pads 201–204. (Note that not all of the cutout portions of the gimbal are shown in this view for clarity reasons.) For example, wires 226 & 227 of coil 208, and wires 224 & 225 of coil 206, are shown soldered to pads 202 & 203, respectively. Similarly, wires 228 & 229 of coil 207, and wires 230 & 231 of coil 209, are soldered to pads 204 & 201, respectively.

Upon removal of the end sections of gimbal 200, each of the pads 201–204 is electrically connected to a separate one of the mounting sections 240–243. In other words, removal of the end sections of the gimbal creates four distinct conductive paths in the remaining sheet metal material from each of the four mounting sections to a corresponding one of the pads 201–204. According to one embodiment of the present invention, current flows through these four paths to control movement of the attached mirror via coils 206–209. This embodiment therefore utilizes the metal of gimbal 200 to conduct electrical current delivered to the moving coil. That is, the electrical connections to the coil wires are integrated with the flexing part of the gimbal. This arrangement thereby eliminates movement of wires during operation of the mirror-gimbal assembly.

Following attachment of the gimbal to platform 270 (see FIG. 2) wires 292–295 may be soldered to tabs 255–258 to establish an electrical connection to coils 206–209. Thus, the conductive paths provided through the flexing beams of gimbal 200 may be used to energize the coils in order to control tilting of the mirror along the x-axis and the y-axis. By way of example, one pair of wires 292–295 may be used to energize one pair of opposing coils (i.e., coils 207 & 209) to control rotation of the mirror about the x-axis, with the remaining pair of wires 292–295 being used to energize the other pair of opposing coils (i.e., coils 206 & 208) to control rotation of the mirror about the y-axis. In the final assembly, permanent magnets are attached within the central opening of each of the coils 206–209.

Torque is developed on the mirror-coil assembly upon application of an appropriate current through the coils, in the presence of the permanent magnetic field. The direction of the force is made to be opposite on each side of the mirror-coil assembly such that the resulting torque rotates or tilts the mirror attached to the top of gimbal 200. Since the mirror-coil assembly is fixedly attached to gimbal 200, gimbal pads 201–204 and mirror 214 rotate together as the mirror-coil assembly rotates. When the applied current is interrupted or halted, the restoring spring force of gimbal 200 returns the assembly to a rest position.

Figure 6:
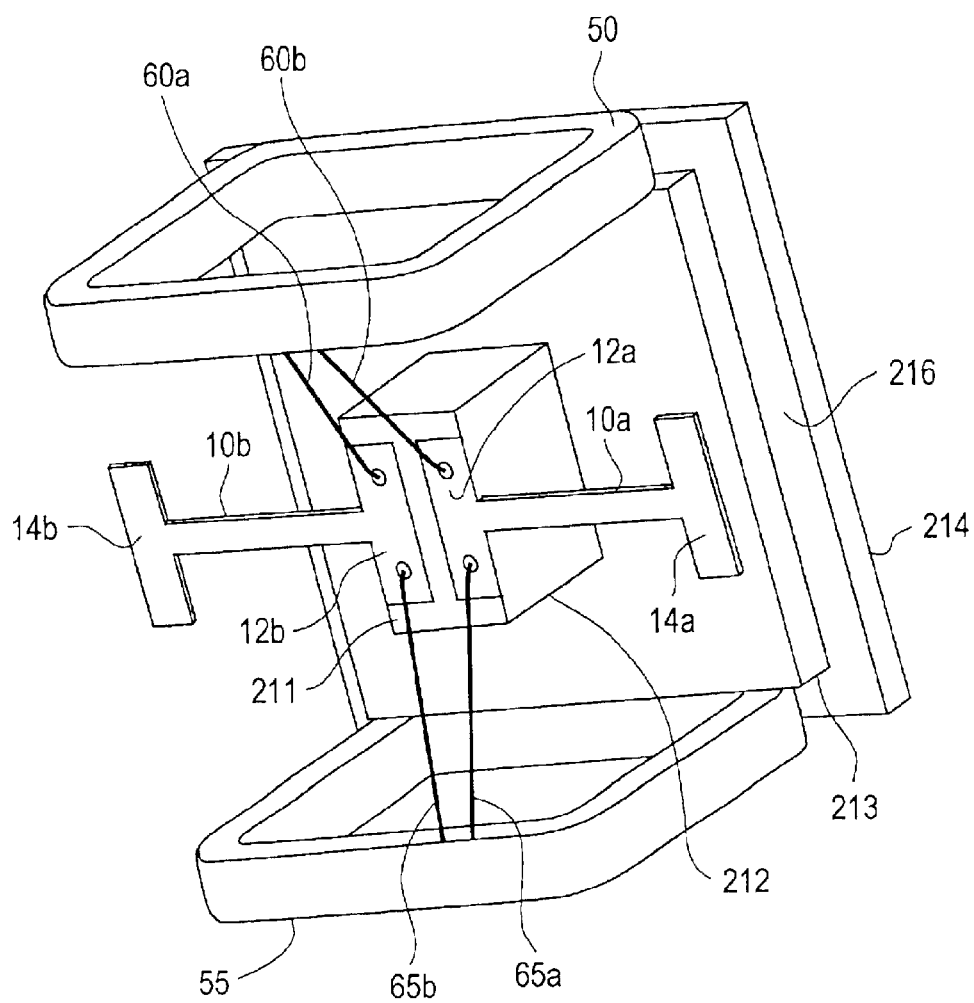
FIG. 6 is a perspective view of an actuator-mirror assembly according to another embodiment of the present invention.

FIG. 6 is a perspective view of another embodiment of an actuator-mirror assembly according to the present invention. The actuator-mirror assembly shown in FIG. 6 rotates about a single axis. In this embodiment, two coils 50 and 55 are adhesively attached to step 216 on opposite sides of mirror 214 and base plate 213. The gimbal for this embodiment comprises two rectilinear, or I-bar, shaped members 10a & 10b of thin sheet metal. Ends 12a & 12b of respective I-bar members 10a & 10b are bonded to surface 211 of pedestal 212. Wires 60a & 60b of coil 50 are soldered to ends 12a & 12b, respectively. Likewise, wires 65a & 65b of coil 55 are also soldered to ends 12a & 12b, respectively. A stationary platform similar to that shown in FIG. 2, but having two posts, supports the assembly of FIG. 6, with the end surfaces of the posts being bonded to ends 14a & 14b of I-bar members 10a & 10b. A wire attached to each of the mounting posts may be soldered to ends 14a & 14b to provide electrical connection through the gimbal members 10a & 10b to energize coils 50 & 55.

Figure 7A:
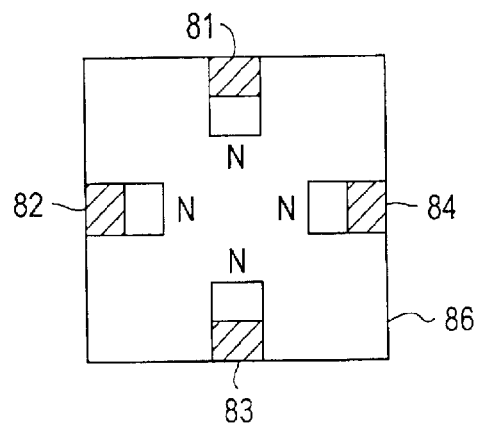
FIGS. 7A & 7B are top and side views of a magnet-housing arrangement for an actuator-mirror assembly in accordance with one embodiment of the present invention.
Figure 7B:
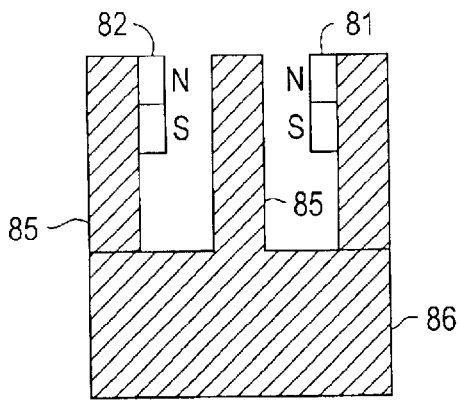

FIGS. 7A & 7B show top and side views of a magnet-housing arrangement for a single actuator-mirror assembly in accordance with one embodiment of the present invention. This magnet-housing arrangement, for example, may be utilized in the actuator-mirror assembly shown in FIG. 4. Magnets 81–84 are bonded on the side surfaces of steel returns 85, attached to a base 86. Magnets 81–84 are positioned adjacent the moving coils (e.g., coils 206–209). The polarities of the magnets are shown by conventional nomenclature for north (N) and south (S). In one embodiment, the magnet material is Neodymium-Iron-Boron. Of course, other types of magnetic materials may be used as well.

Figure 8:
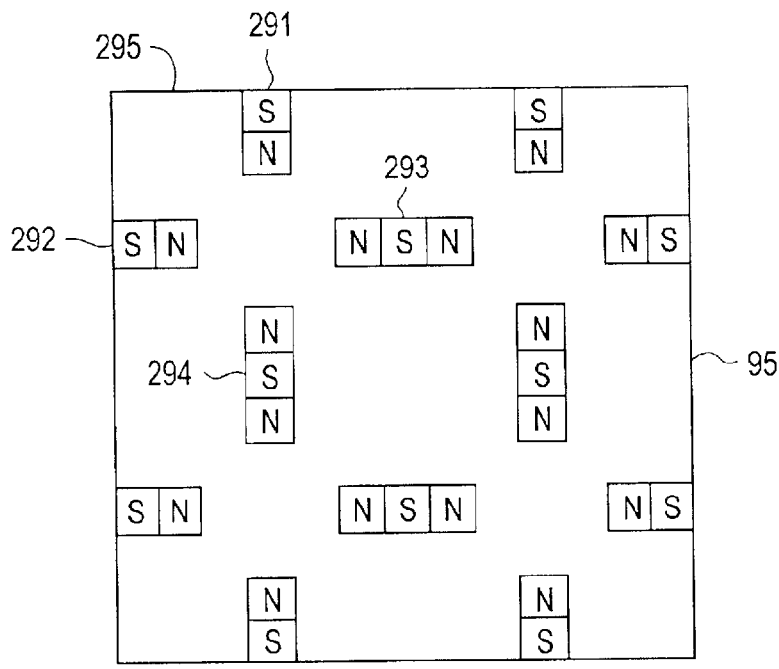
FIG. 8 is a top view of a magnet-housing arrangement for an actuator-mirror assembly in accordance with another embodiment of the present invention.

FIG. 8 shows a top view of a larger magnet-housing arrangement for use with multiple actuator-mirror assemblies.

Figure 9:
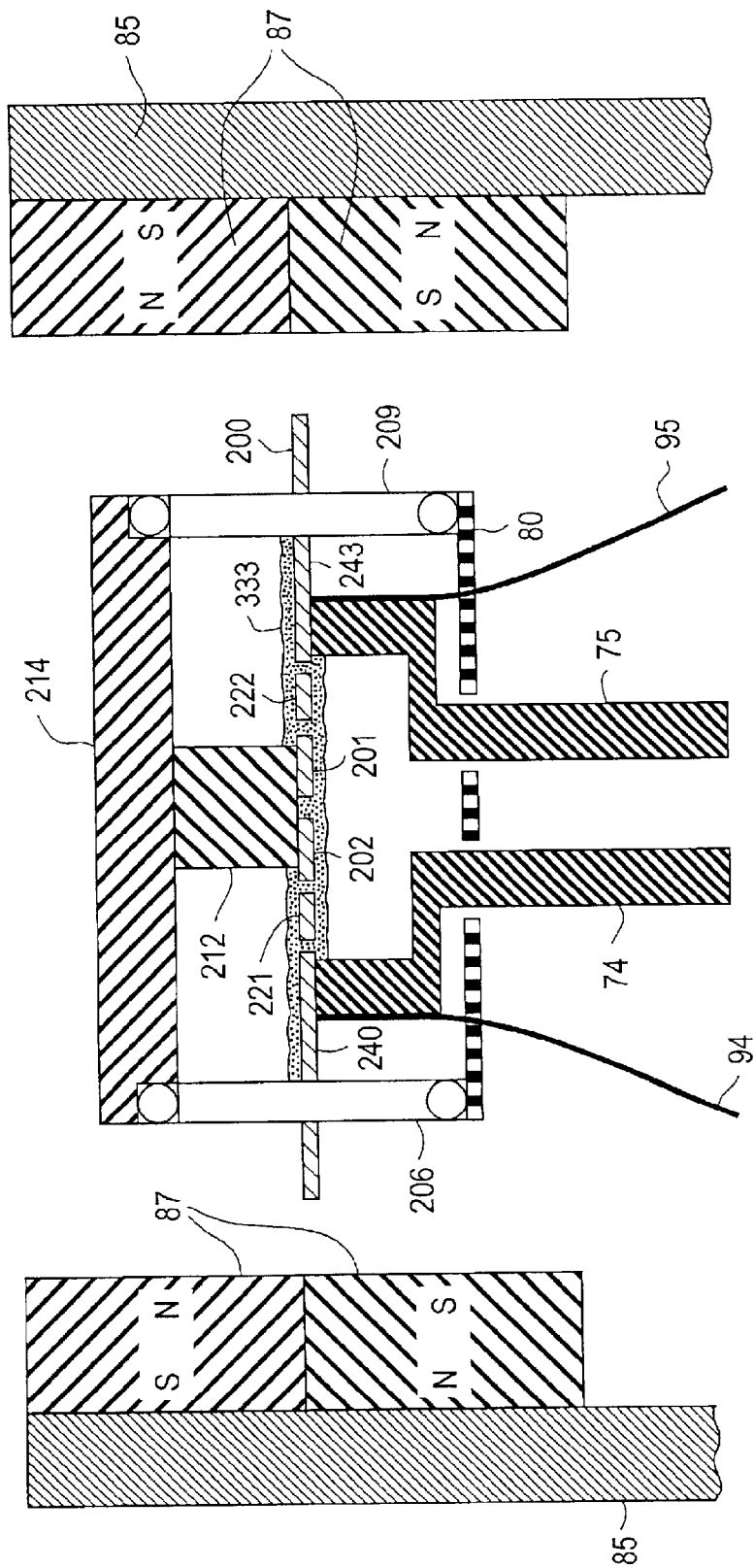
FIG. 9 is a cross-sectional side view of an actuator-mirror assembly according to one embodiment of the present invention.

FIG. 9 is a cross-sectional side view of an actuator-mirror assembly utilizing gimbal 200 according to one embodiment of the present invention. A pair of magnets 87 is shown attached to a steel return on opposite sides of the mirror-coil-gimbal assembly. One pair of magnets 87 are positioned adjacent coil 206, and the other pair of magnets 87 are positioned adjacent coil 209. Each of the coils is bonded to a notched edge surface of mirror plate 214. A pedestal 212 is shown attached to the back of mirror plate 214 and also to pads 201 & 202 of gimbal 200. The end surfaces of posts 74 & 75 are shown respectively bonded to mounting sections 240 & 243, with wires 94 & 95 soldered to sections 240 and 243 in accordance with the wiring scheme described above.

Also included in the cross-section of FIG. 9 is an optional balancing plate 80 attached to the bottom of the coils 206–209. Balancing plate 80 acts to counter-balance the weight of the mirror so that the center of rotation is at the center of gravity. This feature improves external shock and dynamic settling of the actuator. As shown in FIG. 9, balancing plate 80 comprises a solid, flat metal plate with several openings that allow the stationary posts to attach to the gimbal and also permit the gimbal-mirror-coil assembly to move. Instead of having several openings to accommodate mounting of the mirror-coil-gimbal onto stationary posts, balancing plate 80 may also be implemented with a single, centrally located opening. For instance, balancing plate 80 may comprise a rectangular frame having its sides adhesively attached to the coils, as shown in FIGS. 10A & 10B.

The embodiment of FIG. 9 further illustrates the use of an optional damper coating 333, which covers beams 191–198 and gimbal pads 201–204. Damper coating 333 comprises a low viscosity polymer (e.g., an ultraviolet curing resin) that becomes a flexible gel upon curing. Damper coating 333 acts to damp gimbal resonances and improve the settling time of the actuator; yet, because coating 333 is flexible, it does not appreciably affect the stiffness of the gimbal. Damper coating 333 also improves reliability by minimizing the effect of external shock and vibration.

Figure 10A:
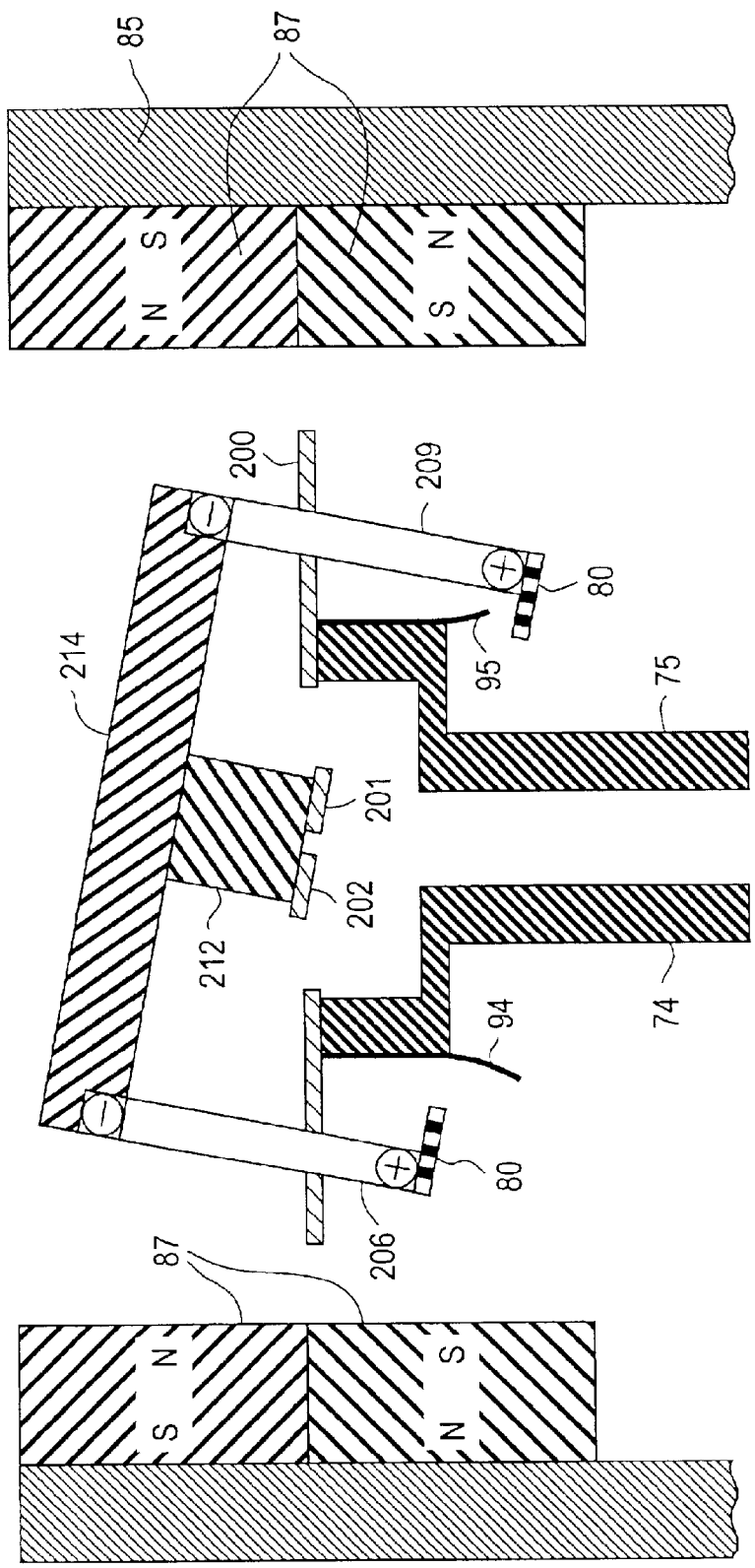
FIGS. 10A & 10B are cross-sectional side views of an actuator-mirror assembly tilted in two different directions in accordance with one embodiment of the present invention.
Figure 10B:
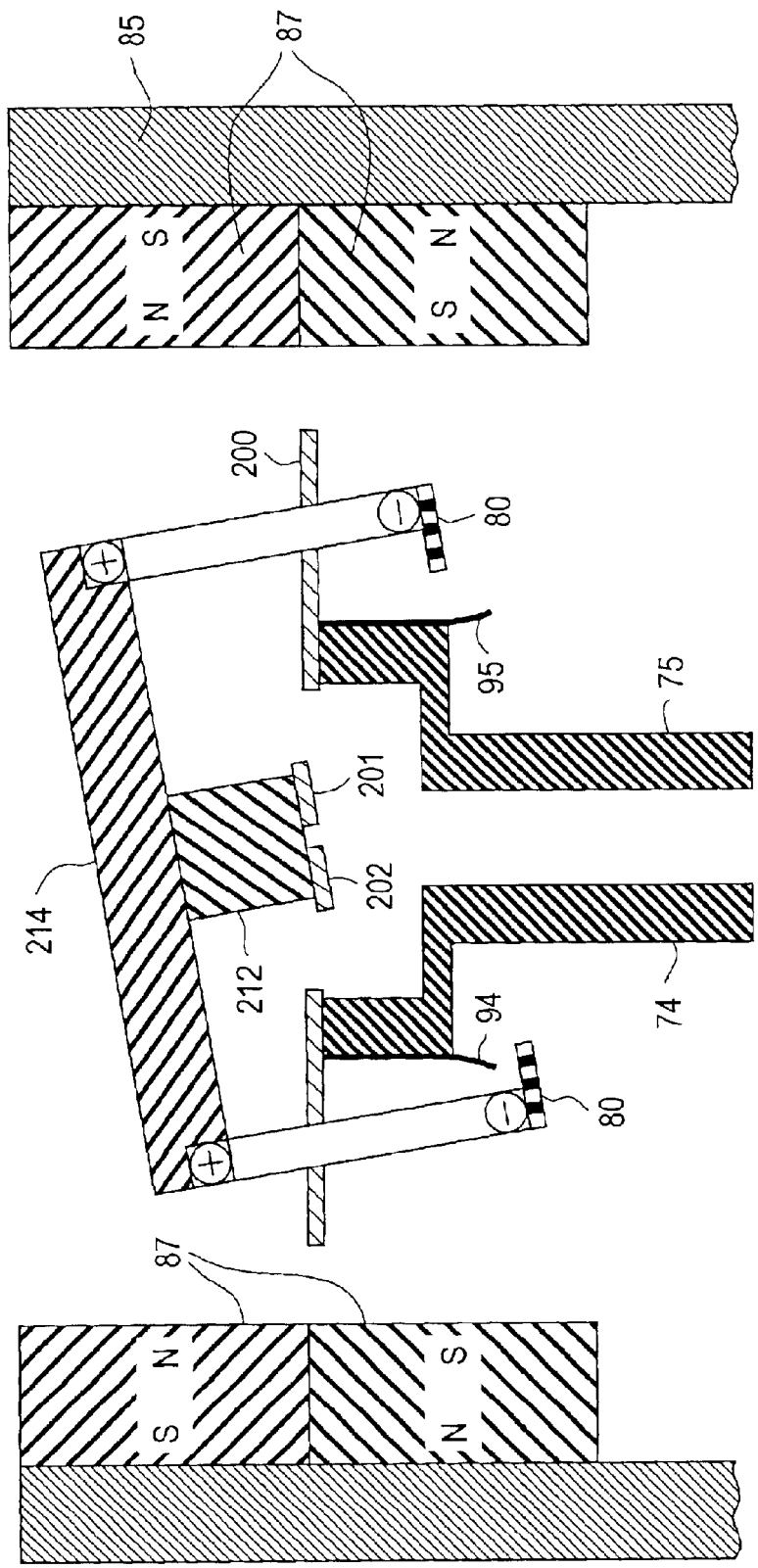

FIGS. 10A & 10B are cross-sectional side views of an actuator-mirror assembly with appropriate current applied to coils 206 & 209 to tilt mirror 214 in two different directions along a single longitudinal axis of movement. Note that in FIGS. 10A & 10B only the rigid sections of gimbal 200 are shown for clarity reasons. Precise movement of mirror 214 along both the x-axis and y-axis is achieved by controlling the current applied to the four coils 206–209 for the embodiments described above.

Figure 11A:
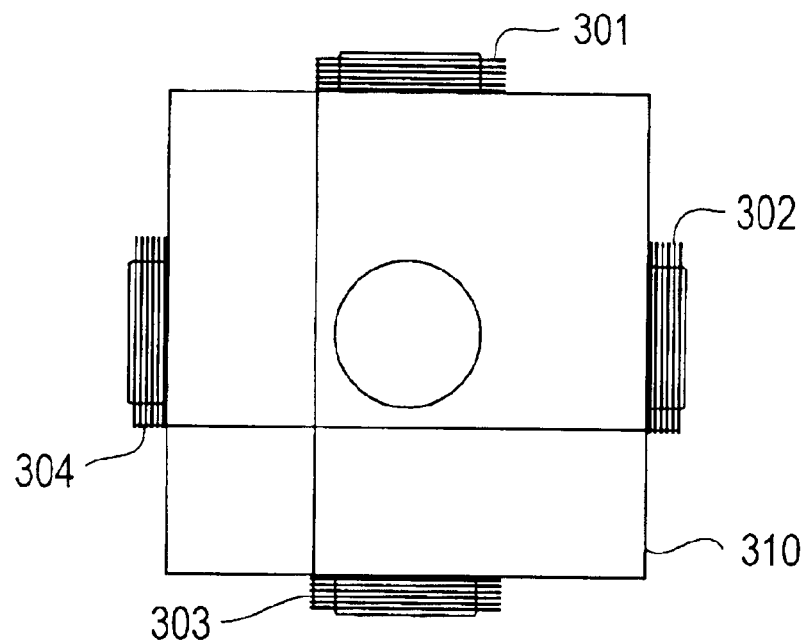
FIGS. 11A & 11B show top and side views of a bobbin coil assembly utilized in accordance with an alternative embodiment of the present invention.
Figure 11B:
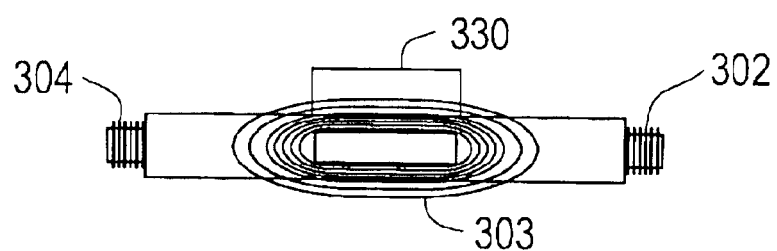
Figure 12:
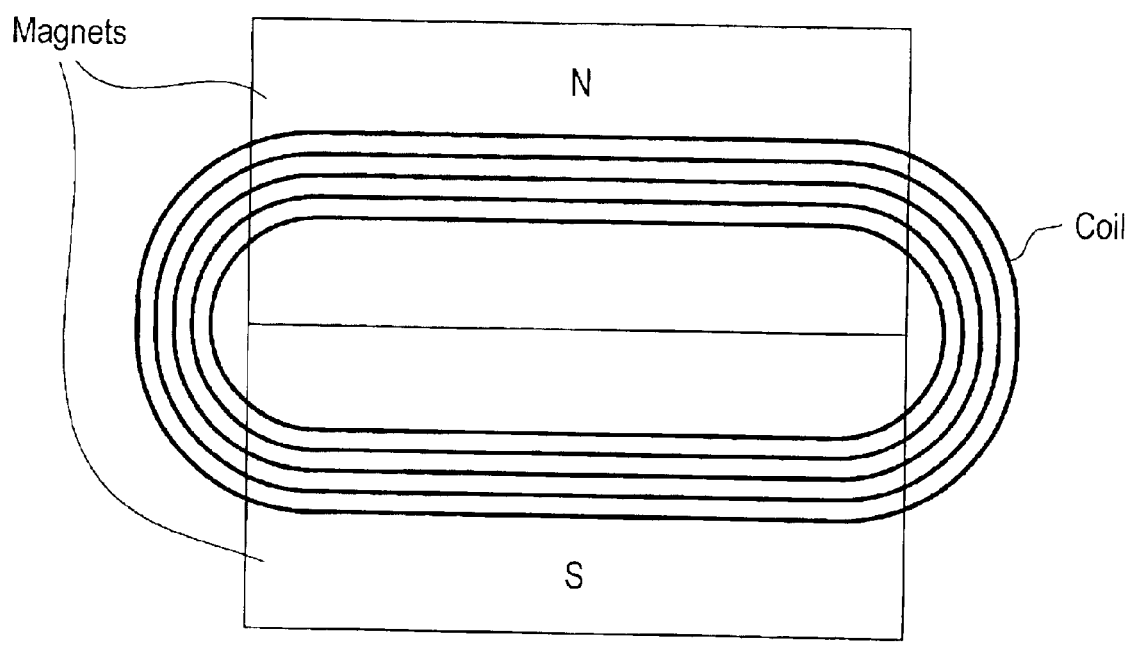
FIG. 12 illustrates the relative position of a coil and magnet assembly in accordance with an alternative embodiment of the present invention.

FIGS. 11A & 11B show top and side views of a bobbin-coil assembly utilized in accordance with an alternative embodiment of the present invention. In this embodiment, the coils 301, 302, 303, and 304 are made from fine copper wire with single-built insulation, and are each wrapped around a post member on a side of bobbin 310. Coils 301, 302, 303, and 304 are physically located between one or more permanent magnets (not shown in this view) in the final assembly. FIG. 12 shows the relative position of a coil and magnet assembly in accordance with this alternative embodiment. The coil windings are supported by and encircle the protruding side members of bobbin 310, shaped in accordance with the dimensions of the permanent magnets. Bobbin pedestal 330 provides a surface for bonding (e.g., adhesive attachment) to a gimbal that suspends bobbin 310 between the permanent magnets.

By way of example, in the embodiment of FIGS. 11A & 11B, each coil may include approximately 48 turns made from 6 layers, with each layer having 8 turns. The number of turns and layers may vary based on the type of coil used, the application, etc. Bobbin 310 may be made from a variety of machined materials (e.g., polymers) as is known in the art. In operation, application of current through the coils generates a magnetic field that interacts with the field of the permanently mounted magnets to torque to tilt the actuator.

Figure 13:
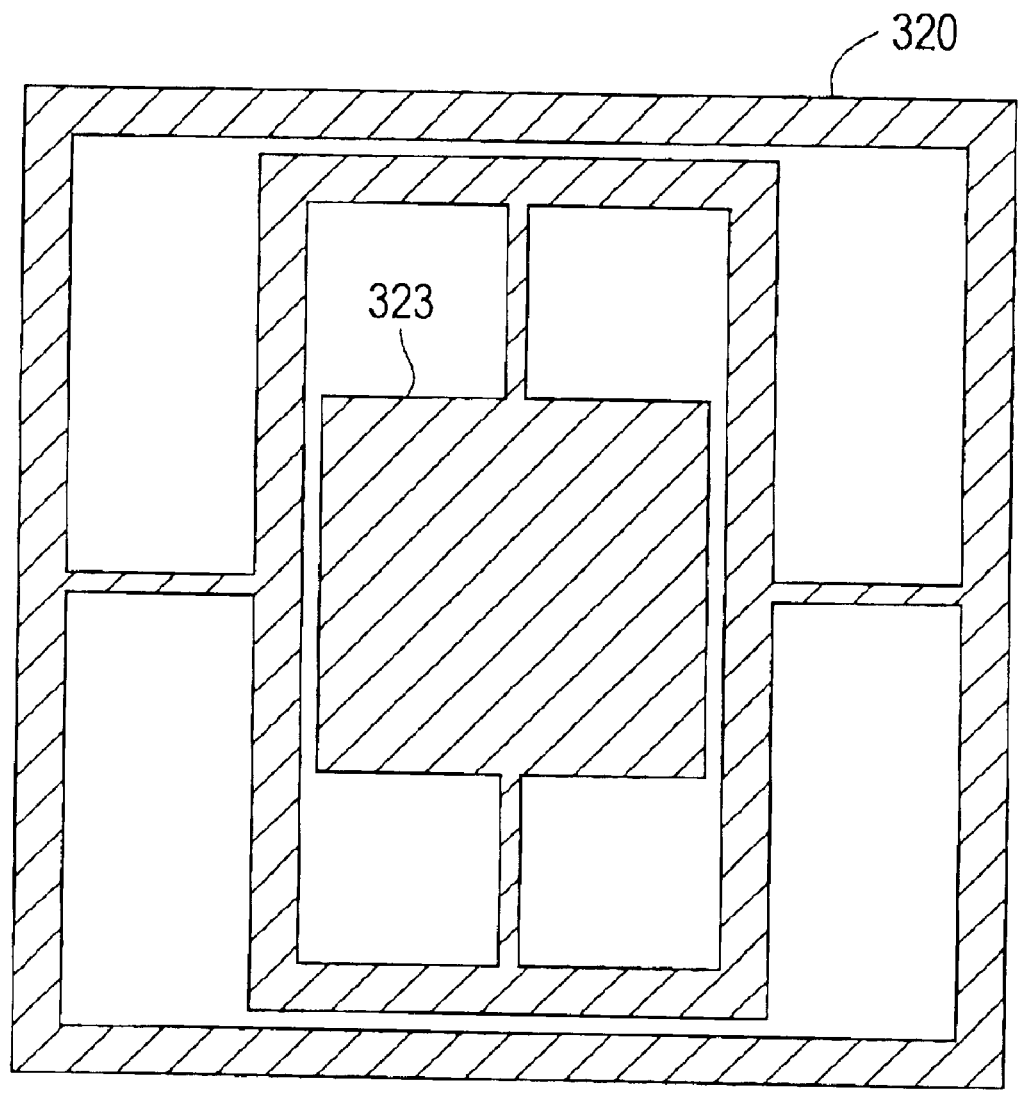
FIG. 13 is a top view of a gimbal utilized in accordance with an alternative embodiment of the present invention.

The bobbin coil assembly of FIGS. 11A & 11B may be bonded to a variety of conventional gimbals. FIG. 13 shows a top view of a conventional gimbal 320 of a type well known in the industry, which may be used to suspend the bobbin-coil assembly shown in FIGS. 11A & 11B. Gimbal 320 is formed of a single sheet of material (e.g., sheet metal) that provides for dual-axis rotation of the bobbin-coil assembly. Bobbin pedestal 330 may, for instance, be bonded to central area 323 of gimbal 320.

Figure 14:
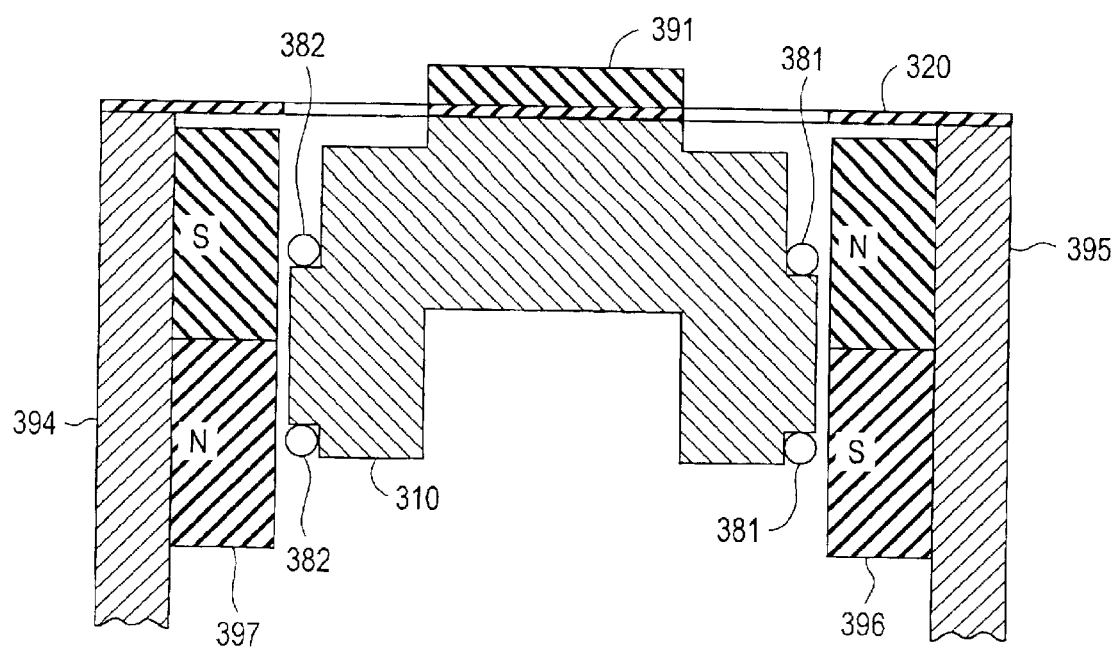
FIG. 14 is a cross-sectional side view of an actuator-mirror assembly in accordance with an alternative embodiment of the present invention.

FIG. 14 shows a cross-sectional side view of an actuator-mirror assembly in accordance with an alternative embodiment of the present invention. In this view, permanent magnets 396 & 397 are positioned on steel returns 395 & 394 adjacent coils 381 & 382, respectively. Coils 381 & 382 are located on opposite sides of a bobbin 310, which is bonded to the center of a gimbal 320, such as that shown in FIG. 13. In this example, gimbal 320 is secured to stationary steel returns 394 & 395. A mirror 391 is secured on the center-top area of gimbal 320.

Torque is developed on the bobbin-coil assembly upon application of an appropriate current through coils 381 & 382, in the presence of the permanent magnetic field. The direction of the force is made to be opposite on each side of bobbin 310 such that the resulting torque rotates or tilts mirror 391 attached to the top of gimbal 320. The bobbin-coil assembly is attached to a gimbal 320 and therefore the gimbal 320 and the mirror 391 will rotate as the bobbin-coil assembly rotates. When the applied current is interrupted or halted, the restoring spring force of gimbal 320 returns the assembly to the rest position shown in FIG. 14.

We claim:

1. A gimbal for supporting a moveable object comprising:
   an attachment section for bonding to the moveable object;
   first and second pairs of beams extending along a longitudinal axis, the first and second pairs of beams being respectively connected to opposite ends of the attachment section;
   third and fourth pairs of beams extending along a transverse axis, the third and fourth pairs of beams being respectively disposed on opposite sides of the attachment section;
   a first one of the third pair of beams being connected with a first one of the first pair of beams, a second one of the third pair of beams being connected with a first one of the second pair of beams, a first one of the fourth pair of beams being connected with a second one of the first pair of beams, and a second one of the fourth pair of beams being connected with a second one of the second pair of beams; and
   first and second mounting sections for bonding to a mount, the first and second mounting sections being connected to the third and fourth pairs of beams, respectively.

2. The gimbal according to claim 1 wherein the attachment section, the first, second, third, and fourth pairs of beams, and the first and second mounting sections comprise a substantially planar material.

3. The gimbal according to claim 2 wherein the substantially planar material comprises an electrically conductive material.

4. The gimbal according to claim 2 wherein the substantially planar material comprises a sheet metal.

5. The gimbal according to claim 1 wherein the first mounting section comprises first and second mounting members respectively connected with the first and second ones of the third pair of beams, and the second mounting section comprises third and fourth mounting members respectively connected with the first and second ones of the fourth pair of beams.

6. The gimbal according to claim 1 wherein the transverse axis is substantially orthogonal to the longitudinal axis.

7. The gimbal according to claim 5 wherein the attachment section is divided into first, second, third, and fourth attachment pads.

8. The gimbal according to claim 7 wherein the first attachment pad is connected to the first one of the first pair of beams, the second attachment pad is connected to the first one of the second pair of beams, the third attachment pad is connected to the second one of the first pair of beams, and the fourth attachment pad is connected to the second one of the second pair of beams.

9. The gimbal according to claim 8 wherein a first electrically conductive path is provided between the first attachment pad and the first mounting member, a second electrically conductive path is provided between the second attachment pad and the second mounting member, a third electrically conductive path is provided between the third attachment pad and the third mounting member, and a fourth electrically conductive path is provided between the fourth attachment pad and the fourth mounting member.

10. The gimbal according to claim 9 wherein the first, second, third, and fourth electrically conductive paths respectively comprise first, second, third, and fourth pieces of substantially planar material, the first piece of substantially planar material integrally including the first attachment pad and the first mounting member, the second piece of substantially planar material integrally including the second attachment pad and the second mounting member, the third piece of substantially planar material integrally including the third attachment pad and the third mounting member, and the fourth piece of substantially planar material integrally including the fourth attachment pad and the fourth mounting member.

11. The gimbal according to claim 1 wherein when the moveable object rotates about the longitudinal axis the first and second pair of beams twists about the longitudinal axis.

12. The gimbal according to claim 1 wherein when the moveable object rotates about the transverse axis the third and fourth pair of beams twists about the transverse axis.

13. The gimbal according to claim 1 wherein the moveable object comprises a mirror.

14. The gimbal according to claim 1 further comprising a damper coating applied to at least the first, second, third and fourth pairs of beams.

15. A gimbal for supporting a moveable object comprising:
   first, second, third, and fourth pieces of substantially planar material, each of which includes;
   a first beam that extends along a longitudinal axis, the first beam having first and second ends;
   an attachment pad for bonding to the moveable object, the attachment pad being connected to the first end of the first beam;
   a second beam that extends along a transverse axis, the second beam having first and second ends, the first end of the second beam being coupled to the second end of the first beam;
   a mounting member for bonding to a stationary mount, the mounting member being connected to the second end of the second beam;
   the first, second, third, and fourth pieces of substantially planar material being arranged such that when the moveable object rotates about the longitudinal axis, the first beam twists, and when the moveable mirror rotates about the transverse axis, the second beam twists.

16. The gimbal according to claim 15 wherein the substantially planar material comprises an electrically conductive material.

17. The gimbal according to claim 15 wherein the substantially planar material comprises a metal.

18. The gimbal according to claim 15 wherein the first, second, third, and fourth pieces of substantially planar material each further comprises an intermediate section connected between the first end of the second beam and the second end of the first beam.

19. The gimbal according to claim 15 wherein the first, second, third, and fourth pieces of substantially planar material are arranged symmetrical about the longitudinal and transverse axes.

20. The gimbal according to claim 15 wherein the moveable object comprises a mirror.

21. The gimbal according to claim 15 further comprising a damper coating applied to at least the first and second beams of the first, second, third, and fourth pieces of substantially planar material.

22. A gimbal for supporting a moveable object comprising first and second pieces of substantially planar material, each of which includes a beam that extends along a longitudinal axis having a first end for bonding to the moveable object and a second end for bonding to a stationary mount, wherein the beam twists when the moveable object rotates about the longitudinal axis.

23. The gimbal according to claim 22 wherein the substantially planar material comprises an electrically conductive material.

24. The gimbal according to claim 22 wherein the substantially planar material comprises a metal.

25. The gimbal according to claim 22 wherein the beam comprises a rectilinear shaped beam.

26. The gimbal according to claim 22 wherein the moveable object comprises a mirror.

27. A gimbal for supporting an electromagnetically actuated object comprising a plurality of pieces of substantially planar material, each of which includes one or more beams, a first area for bonding to a stationary mount, and a second area for attachment to the electromagnetically-actuated object, wherein each of the plurality of pieces of substantially planar material provides an electrically conductive path between the electromagnetically-actuated object and the stationary mount.

28. The gimbal according to claim 27 wherein the electromagnetically-actuated object comprises a mirror-coil assembly.

29. The gimbal according to claim 27 wherein the electrically conductive path is integral with each of the pieces of substantially planar material.

30. The gimbal according to claim 27 wherein the plurality of pieces of substantially planar material comprise first, second, third, and fourth pieces of substantially planar material, each including:
   a first beam that extends along a longitudinal axis, the first beam having first and second ends, the second area being connected to the first end of the first beam; and
   a second beam that extends along a transverse axis, the second beam having first and second ends, the first end of the second beam being coupled to the second end of the first beam, the first area being connected to the second end of the second beam;
   the first, second, third, and fourth pieces of substantially planar material being arranged such that when the electromagnetically actuated object rotates about the longitudinal axis, the first beams twists, and when the electromagnetically actuated object rotates about the transverse axis, the second beam twists.

31. The gimbal according to claim 27 wherein the electromagnetically actuated object comprises a mirror-coil assembly.

32. The gimbal according to claim 27 further comprising a damper coating applied to at least the one or more beams.

* * * * *